UNITED STATES PATENT OFFICE.

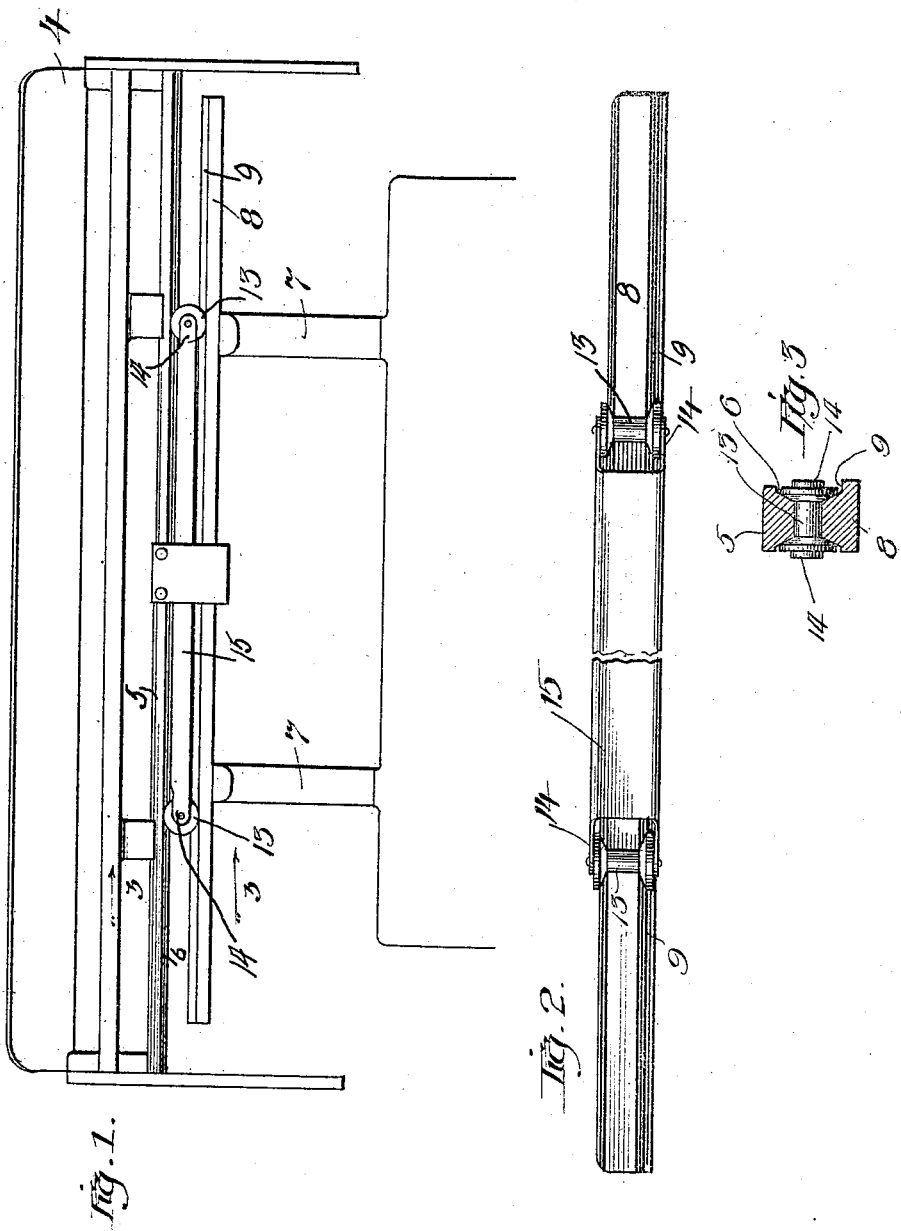

JOSEPH RABER, OF WOODSTOCK, ILLINOIS, ASSIGNOR TO EMERSON TYPEWRITER COMPANY, OF WOODSTOCK, ILLINOIS, A CORPORATION OF ILLINOIS.

TYPE-WRITER CARRIAGE.

1,016,175.  Specification of Letters Patent.  Patented Jan. 30, 1912.

Application filed January 24, 1911. Serial No. 604,343.

*To all whom it may concern:*

Be it known that I, JOSEPH RABER, a citizen of the United States, residing at Woodstock, in the county of McHenry and State of Illinois, have invented certain new and useful Improvements in Type-Writer Carriages, of which the following is a specification.

The present invention relates to a mounting for typewriter carriages, such as serves to carry the platen, paper guide, and other mechanism usually mounted on a carriage.

One of the objects of the present invention is to provide a roller bearing upon which the rear portion of the carriage is mounted, whereby the travel of the carriage back and forth is rendered free and easy.

Another object of the invention is to so form the trackways on which the roller bearings at the rear of the carriage travel as to cause all dirt and sediment to be cut away by the action of the rollers and forced out from said trackway, thus preventing an accumulation of sediment, which in time would materially interfere with the movement of the rollers and hence make the travel of the carriage difficult and jerky.

A further object of the invention is to mount these rollers independently of either the trackways or the carriage, so that they become idle rollers, and thus travel a distance equal to only a part of the movement of the carriage. This eliminates a long and cumbersome fixed trackway and permits the carriage to move clear to its limit of movement in either direction without any danger of carrying the rollers off from the fixed trackway.

In the drawings, Figure 1 is a rear elevation of a typewriter carriage provided with the mounting of the present invention; Fig. 2, a plan view; Fig. 3, a cross-section on line 3—3 of Fig. 1, looking in the direction of the arrow.

The device is applied to a carriage 4, of any ordinary and well-known type. Secured to the carriage is an elongated bar 5 extending, as shown in Fig. 1, substantially across the entire rear of the carriage. The bar 5 is provided, as shown more clearly in Fig. 3, with a longitudinally extending channel 6 formed along the lower outer edge of the bar. Secured to the body of the base of the typewriter are upright posts 7, which serve as a mounting for a bar 8, which, as shown, is of a length less than the bar 5. Of course, these proportions may be substantially varied to suit the class of work for which any particular type of machine is designed, or to conform to the ideas of the mechanic constructing the machine. The bar 8, as shown more clearly in Fig. 3, is provided with longitudinally extending angular portions extending along the upper outer edge thereof.

The rollers 13 are made with tapering flanges, which are to act as the guides in keeping the upper rail in proper relation to the lower rail. As shown in Fig. 1, there are two of these rollers 13, and as shown in Fig. 2, they are mounted within the ends 14 of a spacer member 15, said spacer member being cut away at either end to provide forks between which the rollers lie and in the ends of which they are pivotally mounted.

By referring to Fig. 3, it will be seen that the connections between the rollers extend on the outside of the rollers. By utilizing the idler rollers as a mounting for the carriage, the ordinary groove lug and circular bar old and well known in the art are eliminated and a mounting provided which is practically frictionless and hence serves to give a free and easy movement to the carriage. Since the rollers 12 are not carried or fixedly secured in any way to either the upper or lower rails it follows that the movement a predetermined distance of the carriage will move the rollers across the surface of the lower rail only one-half that distance, since the periphery of the rollers is traveling upon both the surface of the upper rail, which is carried by the carriage, and the surface of the lower rail, which is fixed. By reason of this fact a relatively short fixed rail can be utilized, which will be sufficient to permit of a long enough travel of the rollers to permit of a full movement of the carriage back and forth. A substantially long span is provided between the rollers, so that they contact the upper rail at points far enough removed to prevent any tilting or rocking of the carriage during its movement; and, furthermore, the carriage can travel its full throw in either direction without running the rollers off from the lower rail, although this rail is considerably shorter than the upper rail.

As will be seen from the drawings, practically the entire load of the carriage at the rear is sustained by the rollers, the tapering flanges serving only the function of preventing displacement of the rollers from the trackways.

By referring to Fig. 3, it will be seen that the construction of the rollers is such as to dislodge, by their movements, any sediment or dirt which might collect in the trackway, thus eliminating any danger of the carriage becoming difficult or jerky of movement by reason of a clogged trackway.

I claim:

In a typewriter carriage, the combination of a rear mounting comprising a trackway movable with the carriage in the form of a bar, having downwardly converging side faces, a trackway fixed with respect to the movements of the carriage, having upwardly converging side faces, rollers intermediate said trackways, each comprising a reduced center portion, and outer beveled head-like portions, said beveled portions engaging the converging faces of said trackways, substantially as described.

JOSEPH RABER.

Witnesses:
FRANK WILDER,
W. F. CONWAY.